(12) United States Patent
Livington

(10) Patent No.: US 7,255,792 B2
(45) Date of Patent: Aug. 14, 2007

(54) METHOD FOR MODIFYING AN ORGANIC COMPOSITION

(75) Inventor: Andrew Guy Livington, London (GB)

(73) Assignee: Membrane Extraction Technology Limited (GB)

( * ) Notice: Subject to any disclaimer, the term of this patent is extended or adjusted under 35 U.S.C. 154(b) by 339 days.

(21) Appl. No.: 10/471,360

(22) PCT Filed: Mar. 15, 2002

(86) PCT No.: PCT/GB02/01216

§ 371 (c)(1), (2), (4) Date: Sep. 10, 2003

(87) PCT Pub. No.: WO02/076588

PCT Pub. Date: Oct. 3, 2002

(65) Prior Publication Data

US 2004/0097766 A1  May 20, 2004

(30) Foreign Application Priority Data

Mar. 27, 2001 (GB) .................. 0107636.3

(51) Int. Cl.
- *B01D 61/00* (2006.01)
- *B01D 59/12* (2006.01)
- *C07C 7/00* (2006.01)
- *B01D 63/00* (2006.01)

(52) U.S. Cl. ............ 210/652; 210/641; 210/644; 210/649; 95/45; 95/50; 95/52; 585/818; 585/800; 585/804

(58) Field of Classification Search ........ 210/651–652, 210/640, 644, 649, 641; 95/45, 50, 52; 585/818, 585/800, 804; 426/417

See application file for complete search history.

(56) References Cited

U.S. PATENT DOCUMENTS 4,093,540 A  *  6/1978  Sen Gupta .................. 554/80

(Continued)

FOREIGN PATENT DOCUMENTS

EP  0 485 077 A1  5/1992

OTHER PUBLICATIONS

Nanofiltration Studies of Larger Organic Microsolutes in Methanol Solutions, Whu et al., Journal of Membrane Science 170 (2000) 159-172.

(Continued)

Primary Examiner—Ana Fortuna
(74) Attorney, Agent, or Firm—Knobbe, Martens, Olson and Bear, LLP

(57) ABSTRACT

There is provided a process for modifying a first organic composition comprising (i) at least one first solvent, (ii) at least one solute, and (iii) optionally, at least one second solvent to produce a modified organic composition in which the concentration of the at least one first solvent is reduced and the concentration of the at least one second solvent is increased, comprising the steps of: (a) providing a selectively permeable membrane having a first surface and a second surface; (b) transferring a portion of the first solvent and optionally a portion of the solute from the first surface to the second surface across the membrane by contacting the first organic composition with the first surface, wherein the pressure at the first surface is greater than the pressure at the second surface, and wherein the membrane is a selectively permeable membrane such that the membrane rejection (R) of the solute is greater than 0%; (c) adding a portion of the second solvent to the organic composition retained at the first surface of the membrane.

28 Claims, 6 Drawing Sheets

U.S. PATENT DOCUMENTS

Figure 1:
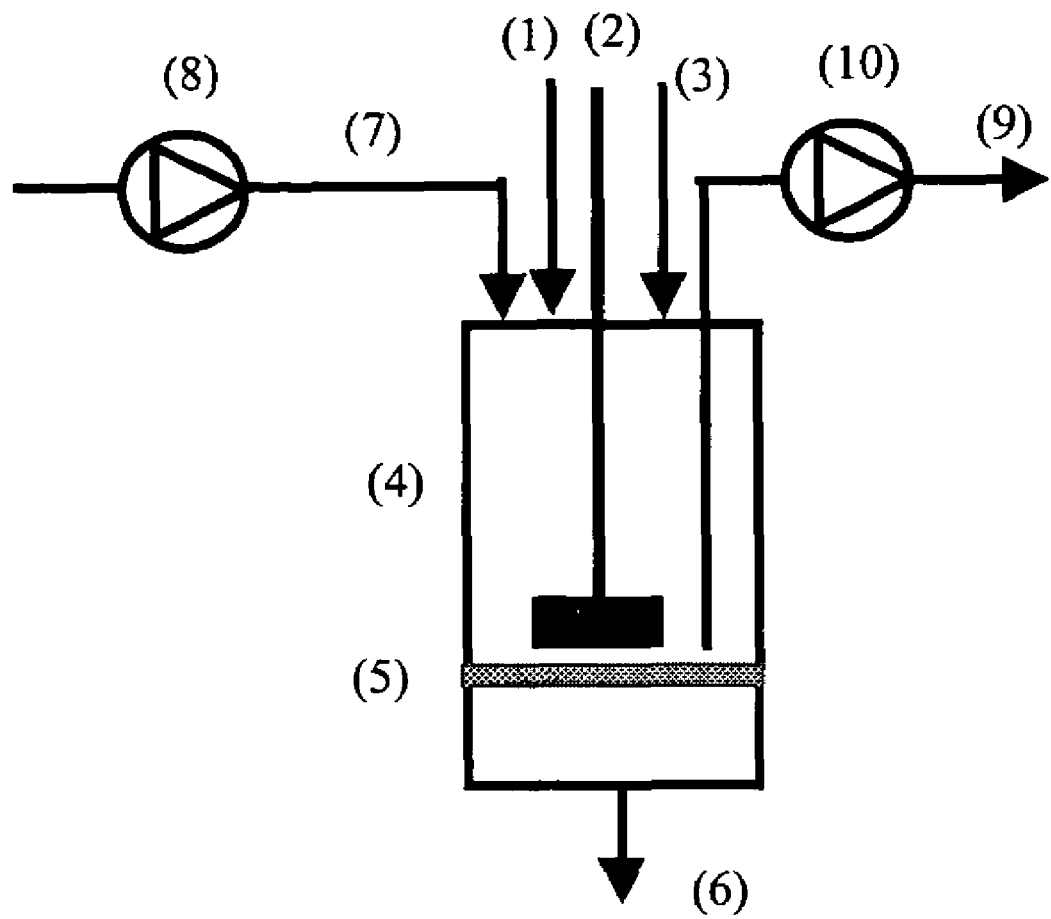

| | | | |
|---|---|---|---|
| 4,484,018 A * | 11/1984 | McLynn | 136/230 |
| 4,750,990 A * | 6/1988 | Kulkarni et al. | 208/251 R |
| 4,770,768 A | 9/1988 | Lang | |
| 4,806,244 A * | 2/1989 | Guilhem | 210/638 |
| 4,814,088 A * | 3/1989 | Kutowy et al. | 210/651 |
| 4,966,707 A * | 10/1990 | Cussler et al. | 210/632 |
| 5,024,929 A * | 6/1991 | Lougheed et al. | 430/546 |
| 5,264,166 A | 11/1993 | White et al. | |
| 5,298,669 A | 3/1994 | Healy et al. | |
| 5,387,378 A * | 2/1995 | Pintauro et al. | 264/48 |
| 5,494,566 A | 2/1996 | Gould et al. | |
| 5,501,797 A * | 3/1996 | Meindersma et al. | 210/651 |
| 5,503,750 A * | 4/1996 | Russo et al. | 210/641 |
| 5,676,832 A * | 10/1997 | Katraro et al. | 210/198.2 |
| 6,340,580 B1 * | 1/2002 | Horowitz | 435/135 |
| 6,616,595 B2 * | 9/2003 | Riach, Jr. | 600/9 |
| 6,649,062 B1 * | 11/2003 | Petty | 210/649 |

OTHER PUBLICATIONS

Nanofiltration in Non-Aqueous Solutions by Porour Silica-Zirconia Membranes, Tsuru et al., Journal of Membrane Science 185 (2001) 253-261.

Nanofiltration-Based Diafiltration Process for Solvent Change in Pharmaceutical Manufacturing, Sheth et al., Journal of Membrane Science 211 (2003) 251-261.

* cited by examiner

METHOD FOR MODIFYING AN ORGANIC COMPOSITION

The present invention relates to solvent exchange processes. In another aspect, it relates to concentration of organic solutes in organic solvents using solvent resistant nanofiltration membranes. In another aspect it relates to addition of one or more solvents to an organic liquid containing solutes and solvents to change the composition of the mixture. In particular the process comprises utilising solvent resistant nanofiltration membranes to alter the mixture of solvents in which one or more solutes is dissolved.

Many organic syntheses take place through multiple sequential stages. These stages may comprise for example sequential reaction stages, or reaction stages followed by purification stages. In many cases the organic molecules which are the products of a first stage are present dissolved as solutes in a first solvent or a first solvent mixture at the completion of the first stage. The second, following stage may comprise for example purification or another reaction stage. In many cases, this second stage may require that the products of the first stage are dissolved in a second solvent or a second solvent mixture different to that used in the first stage. Altering the solvent or solvent mixture composition from the first solvent or solvent mixture to the second solvent or solvent mixture requires a solvent exchange operation.

In general, two important cases can be identified for solvent exchange operations, depending on the boiling points of the first solvent and the second solvent. The first case is when the first solvent has a lower boiling point than both the second solvent and the solute. In this case, distillation can be employed to remove aliquots of the first solvent. Aliquots of the second solvent can be added to replace the first solvent as it is boiled off, and the process will eventually result in a mixture comprising the solute dissolved in the second solvent. The second case is when the first solvent has a higher boiling point than the second solvent, but lower than the solute. Here it is not possible to exchange solvents by progressively distilling and adding the second solvent, as the condensed distillate will tend to be rich in the second solvent and so the first solvent will not be removed. To overcome this difficulty, it may be necessary to use vacuum distillation coupled with a scraped surface drier to remove essentially all the first solvent prior to adding any of the second solvent. This process may be time consuming and may result in the solutes being exposed to temperatures higher than their thermal decomposition temperatures, which may cause loss of products through thermal decomposition. It can be understood by one skilled in the art that the same general problems exist when instead of having a first solvent and a second solvent, mixtures of several solvents are present in the first stage, or in the second stage, or in both. Indeed in systems involving mixed solvents azeotropes may form which further complicate distillation as a means to effect solvent exchange.

Membrane processes are well known in the art of separation science, and can be applied to a range of separations of species of varying molecular weights in liquid and gas phases (see for example "Membrane Technology" in Kirk Othmer Encyclopedia of Chemical Technology, 4$^{th}$ Edition 1993, Vol 16, pages 135-193). Nanofiltration is a membrane process utilising membranes whose pores are in the range 0.5-5 nm, and which have MW cutoffs of 200-1000 Daltons. Nanofiltration has been widely applied to filtration of aqueous fluids, but due to a lack of suitable solvent stable membranes has not been widely applied to separation of solutes in organic solvents.

U.S. Pat. Nos. 5,205,934 and 5,265,734 describe processes for producing composite nanofiltration membranes which comprise a layer of silicone immobilised onto a support, preferably a polyacrylonitrile support. These composite membranes are claimed to be solvent stable and are claimed to have utility for separation of high molecular weight solutes, including organometallic catalyst complexes, from organic solvents. The performance of these composite membranes in separating solutes from methanol solutions has been described in the open literature ("Nanofiltration studies of larger organic microsolutes in methanol solutions", Whu J. A., Baltzis B. C., Sirkar K. K. Journal of Membrane Science 170 (2000) pages 159-172), and their performance in permeation of pure solvent phases has also been reported ("Effect of solvent properties on permeate flow through nanofiltration membranes. Part I—investigation of parameters affecting solvent flux" Machado D. R., Hasson D., Semiat R. Journal of Membrane Science 163 (1999) pages 93-102). The application of these membranes to recovering solvents from chromatographic systems is described in U.S. Pat. No. 5,676,832.

U.S. Pat. No. 5,264,166 describes processes for the production of asymmetric polyimide membranes which are claimed to be stable in solvents such as toluene, benzene, xylene, methyl ethyl ketone (MEK) and methyl iso butyl ketone (MIBK). These asymmetric membranes are claimed to have utility for the separation of low molecular weight organic materials with a molecular weight in the range 300-400 from solvents with molecular weight of around 100. The application of these membranes to solvent recovery from lube oil filtrates are described in U.S. Pat. Nos. 5,360,530; 5,494,566; 5,651,877, and in the open literature in "Solvent recovery from lube oil filtrates with a polyimide membrane" White L. S., Nitsch A. R. Journal of Membrane Science 179 (2000) pages 267-274.

The use of membranes to separate catalysts from organic solvents is known in the art and has been described in the open literature. "Reverse Osmosis in Homogeneous Catalysis" Gosser L. W., Knoth W. H., Parshall G. W. Journal of Molecular Catalysis 2 (1977) pages 253-263 describes experiments using selectively permeable polyimide membranes to separate soluble transition metal catalysts from reaction mixtures by reverse osmosis. "Modeling of nanofiltration—assisted organic synthesis", J. A. Whu, B. C. Baltzis, K. K. Sirkar, Journal of Membrane Science, 163 (1999) 319-331 describes modelling used to investigate the potential application of solvent stable nanofiltration membranes to catalyst separation and recycle.

The patent literature also describes the use of membranes to separate catalysts from organic solvents. U.S. Pat. No. 5,174,899 discloses the separation of organometallic compounds and/or metal carbonyls from their solutions in organic media with the aid of semi-permeable membranes made of aromatic polyamides.

U.S. Pat. Nos. 5,215,667; 5,288,818 5,298,669 and 5,395,979 describe the use of a hydrophobic membrane to separate water-soluble noble metal ionic phosphine ligand complex catalysts from aldehyde containing hydroformylation reaction mediums comprising aqueous solutions, emulsions or suspensions of said catalysts. U.S. Pat. No. 5,681,473 describes the application of solvent-resistant composite membranes to separation of organic-solubilised rhodiumorganophosphite complex catalyst and free organophosphite ligand from a homogeneous non-aqueous hydroformylation reaction mixture.

In the above prior art, membrane separation has not been applied to solvent exchange processes.

The present invention addresses the problems of the prior art.

In one aspect the present invention provides a process for carrying out a solvent exchange by altering the composition of an organic liquid containing at least one first solvent and at least one solute, to produce a final organic liquid mixture in which the concentration of the at least one first solvent is reduced and the concentration of an at least one second solvent has been increased, comprising the steps of: (a) providing a selectively permeable membrane having a first surface and a second surface; (b) transferring a portion of the first solvent and optionally a portion of the at least one solute from the first surface to the second surface across the membrane by contacting the organic liquid with the first surface, wherein the pressure at the first surface is greater than the pressure at the second surface, and wherein the membrane is a selectively permeable membrane such that the membrane rejection (R) of the at least one solute is greater than 0%; (c) adding a portion of at least one second solvent to the organic liquid retained at the first surface of the membrane in step (b).

In a further preferred embodiment the organic liquid resulting from step (c) is further enriched in the second solvent relative to the first solvent through the steps of: (d) providing a selectively permeable membrane having a first surface and a second surface; (e) transferring a portion of the first and second solvents and optionally a portion of the at least one solute from the first surface to the second surface across the membrane by contacting the organic liquid from step (c) with the first surface, wherein the pressure at the first surface is greater than the pressure at the second surface, and wherein the membrane is a selectively permeable membrane such that the membrane rejection R of the at least one solute is greater than 0%; (f) adding a further portion of the at least one second solvent to the organic liquid retained at the first surface of the membrane in step (e).

By the term "selectively permeable" it is meant a membrane which will allow the passage of solvents while retarding the passage of solutes, such that a solute concentration difference can be produced by the solvent flow across the membrane. The term selectively permeable may be defined in terms of membrane rejection R, a common measure known by those skilled in the art and defined as:

$$R = \left(1 - \frac{C_{P,i}}{C_{R,i}}\right) \times 100\% \quad (1)$$

where $C_{P,i}$=concentration of species i in the permeate, permeate being the organic liquid which has passed through the membrane, and $C_{R,i}$=concentration of species i in the retentate, retentate being the organic liquid which has not passed through the membrane. It will be appreciated that a membrane is selectively permeable for a species if R>0.

By the term "solute" it is meant an organic molecule with a molecular weight in the range 200-2000 Daltons which is present dissolved in at least one solvent, such that the concentration of the solute in the resultant organic liquid mixture is less than 20 wt %.

By the term "solvent" it is meant an organic liquid with molecular weight less than 300 Daltons in which the solute can be dissolved to a concentration of at least 0.1 wt %.

In a further aspect the present invention provides for carrying out a solvent exchange by omitting step (b), so that the at least one second solvent is added to the organic liquid prior to membrane filtration step (e).

In yet a further aspect the process may be carried out continuously so that steps (b) and (c) or (e) and (D are performed simultaneously.

In yet a further aspect, the process may be carried out discontinuously.

In yet a further aspect, more than one selectively permeable membrane may be employed, so that the membranes used in steps (b) and (e), or in multiple repeats of step (e), may be different. This allows the membrane to be chosen to provide the best combination of solvent flux and solute rejection for a specific composition of the organic liquid phase to be contacted with the membrane. By way of non-limiting example, where toluene is the first solvent to be exchanged for methanol as a second solvent, the membrane used for the first filtration step (b) may be chosen to provide a high toluene flux, while the membrane chosen for the second filtration step (e) may be chosen to provide a high methanol flux.

It is understood that the at least one first solvent may be replaced by a first mixture of solvents, or the at least one second solvent may be replaced by a second mixture of solvents, or both first solvent and second solvent can be replaced by a first mixture of solvents and a second mixture of solvents respectively, such that the first mixture of solvents and the second mixture of solvents vary in composition, without materially affecting the nature of the invention.

In yet further cases there may be more than one solute present in the organic liquid, and more than one of these solutes may be retained at the first surface of the membrane employed. In yet other cases, there may be more than one solute present in the organic liquid, only some of which are retained at the surface of the membrane.

We have found that in some cases during the membrane separation steps (b) or (e) the solute can attach itself loosely to the membrane surface. In these cases it can be readily washed off using fresh second solvent provided in the subsequent step (c) or (f). We have also found that in some cases during membrane separation steps (b) or (e) the solute can begin to form crystals or other solids as solvent passes through the membrane and solute concentration in the retained liquid rises. In these cases the solids may be re-dissolved in the fresh second solvent added during a subsequent step (c) of (f).

In yet a further preferred embodiment, the membrane may be backflushed using either solvent or gas, to remove deposited material and improve flux.

In yet a further aspect, the invention may be applied to solvent exchanges wherein the organic liquid mixture containing the first solvent and the solute result from an organic synthesis reaction and wherein it is desired to exchange solvents to a second solvent from which the solute will be crystallised so as to purify the solute species.

In some cases it may be necessary to heat or cool the organic liquid prior to contact with the membrane in steps (b) or (e). For cases in which a crystallisation is employed following solvent exchange, it may prove useful to heat the second solvent prior to steps (c) or (f), thus increasing solute solubility, and then to subsequently decrease temperature following steps (c) or (f) to effect crystallisation.

Preferably the solute will have a molecular weight of above 200 Daltons; yet more preferably above 300 Daltons, and yet more preferably above 400 Daltons.

The solvents will be chosen with regard to solubility of solutes, viscosity, and miscibility with other solvents, among other factors such as cost and safety. Suitable inert solvents are numerous and well known to those skilled in the art. By way of non-limiting example, suitable solvents include aromatics, alkanes, ketones, glycols, chlorinated solvents, esters, ethers, amines, nitrites, aldehydes, phenols, amides, carboxylic acids, alcohols and dipolar aprotic solvents, and mixtures thereof.

By way of non-limiting example, specific examples of solvents include toluene, xylene, benzene, styrene, anisole, chlorobenzene, dichlorobenzene, chloroform, dichloromethane, dichloroethane, ethyl acetate, methyl ether ketone (MEK), methyl iso butyl ketone (MIBK), acetone, ethylene glycol, ethanol, methanol, propanol, butanol, hexane, cyclohexane, dimethoxyethane, methyl tert butyl ether (MTBE), diethyl ether, adiponitrile, N,N dimethylfomamide, dimethyl sulfoxide, dioxane, nitromethane, nitrobenzene, pyridine, carbon disulfide, tetrahydrofuran, N-methyl pyrrolidone, acetonitrile, water, and mixtures thereof.

The membrane of the present invention can be configured in accordance with any of the designs known to those skilled in the art, such as spiral wound, plate and frame, shell and tube, and derivative designs thereof. The membranes may be of cylindrical or planar geometry.

The membrane of the present invention may be a porous or a non-porous membrane. Suitable membranes will have a rejection for the at least one solute greater than 0%, yet more preferably greater than 40%, yet more preferably greater than 70%, yet more preferably greater than 90% and yet more preferably greater than 99%.

The membrane of the present invention may be formed from any polymeric or ceramic material which provides a separating layer capable of preferentially separating the solute from the solvent in steps (b) or (e). Preferably the membrane is formed from or comprises a material selected from polymeric material suitable for fabricating microfiltration, ultrafiltration, nanofiltration or reverse osmosis membranes, including polyethylene, polypropylene, polytetrafluoroethylene (PTFE), polyvinylidene difluoride (PVDF), polyethersulfone, polyacrylonitrile, polyamide, polyimide, cellulose acetate, and mixtures thereof. The membranes can be made by any technique known to the art, including sintering, stretching, track etching, template leaching, interfacial polymerisation or phase inversion. Yet more preferably the membrane is prepared from an inorganic material such as by way of non-limiting example silicon carbide, silicon oxide, zirconium oxide, titanium oxide, or zeolites, using any technique known to those skilled in the art such as sintering, leaching or sol-gel processes.

In a preferred aspect the membrane is non-porous and the non-porous, selectively permeable layer thereof is formed from or comprises a material selected from modified polysiloxane based elastomers including polydimethylsiloxane (PDMS) based elastomers, ethylene-propylene diene (EPDM) based elastomers, polynorbornene based elastomers, polyoctenamer based elastomers, polyurethane based elastomers, butadiene and nitrile butadiene rubber based elastomers, natural rubber, butyl rubber based elastomers, polychloroprene (Neoprene) based elastomers, epichlorohydrin elastomers, polyacrylate elastomers, polyethylene, polypropylene, polytetrafluoroethylene (PTFE), polyvinylidene difluoride (PVDF) based elastomers, polyetherblock amides (PEBAX), and mixtures thereof.

In a preferred aspect the membrane comprises a reinforcing material selected from an external mesh and support. This is particularly advantageous for homogenous tubes or sheets. Such tubes or sheets may be reinforced to increase their burst pressure, for example by overbraiding tubes using fibres of metal or plastic, or by providing a supporting mesh for flat sheets.

When the membrane comprises a non-porous layer and an additional component, the additional component may be a supporting layer. The supporting layer may be a porous support layer. Suitable materials for the open porous support structure are well known to those skilled in the art of membrane processing. Preferably the porous support is formed from or comprises a material selected from polymeric material suitable for fabricating microfiltration, ultrafiltration, nanofiltration or reverse osmosis membranes, including polyethylene, polypropylene, polytetrafluoroethylene (PTFE), polyvinylidene difluoride (PVDF), polyethersulfone, polyacrylonitrile, polyamide, polyimide, and mixtures thereof.

Selectively permeable membranes useful for the present invention are disclosed in U.S. Pat. Nos. 5,205,934; 5,265,734; 4,985,138; 5,093,002; 5,102,551; 4,748,288; 4,990,275; 4,368,112 and 5,067,970. Preferred membranes are produced by WR Grace & Co and are described in U.S. Pat. No. 5,624,166 and WO 00/06293.

The rejection performance of the membrane may be found to be improved by pre-soaking the membrane in one or more of the solvents to be used in the solvent exchange.

The process may be performed in a continuous, semi-continuous or discontinuous (batch mode) manner.

The process may be performed using dead-end or cross-flow filtration. In cases where dead-end filtration is used the pressure may be supplied through a suitable pump or through a pressurizing gas, or through any other device designed to exert pressure at the first surface of the membrane.

Figure 2:
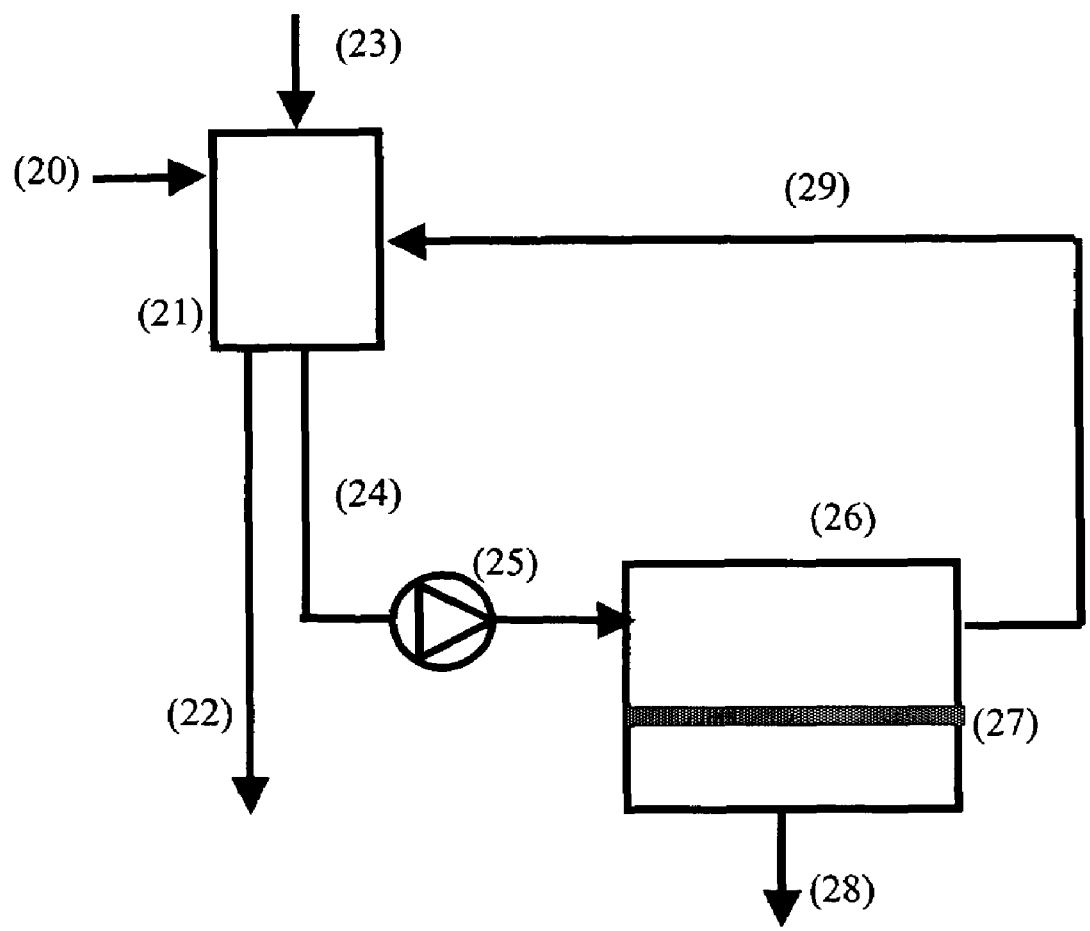
Figure 3:
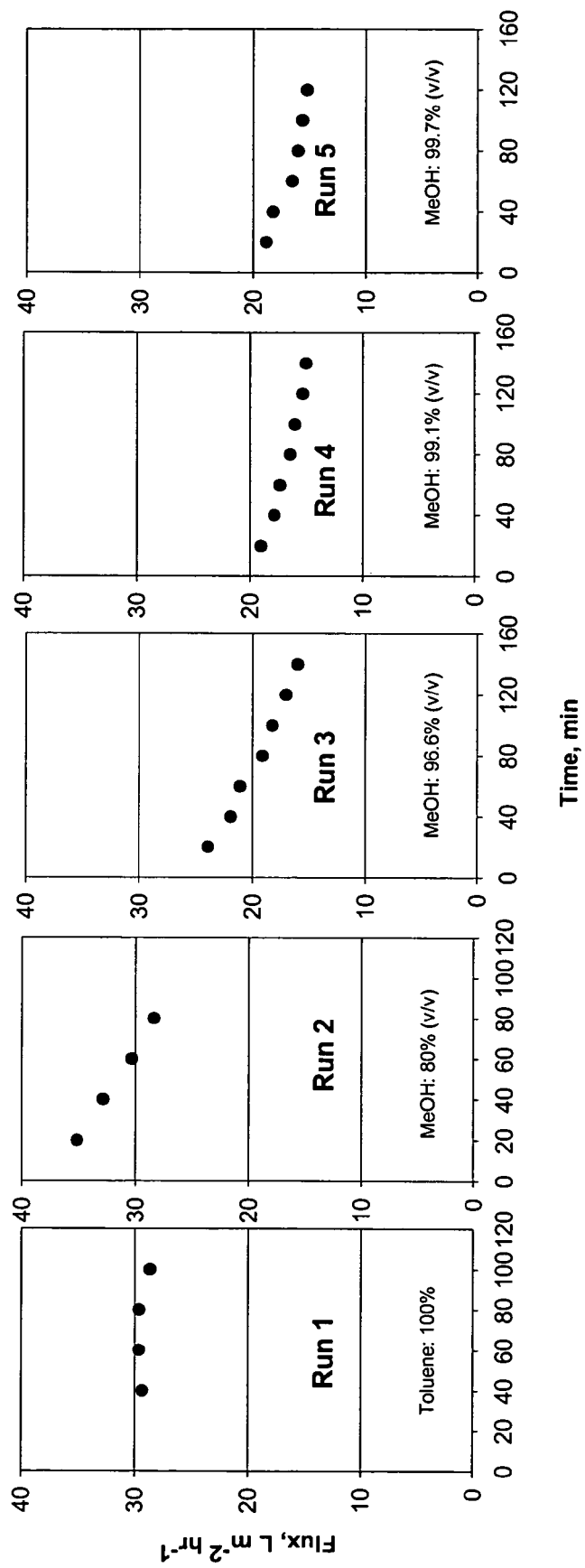
Figure 4:
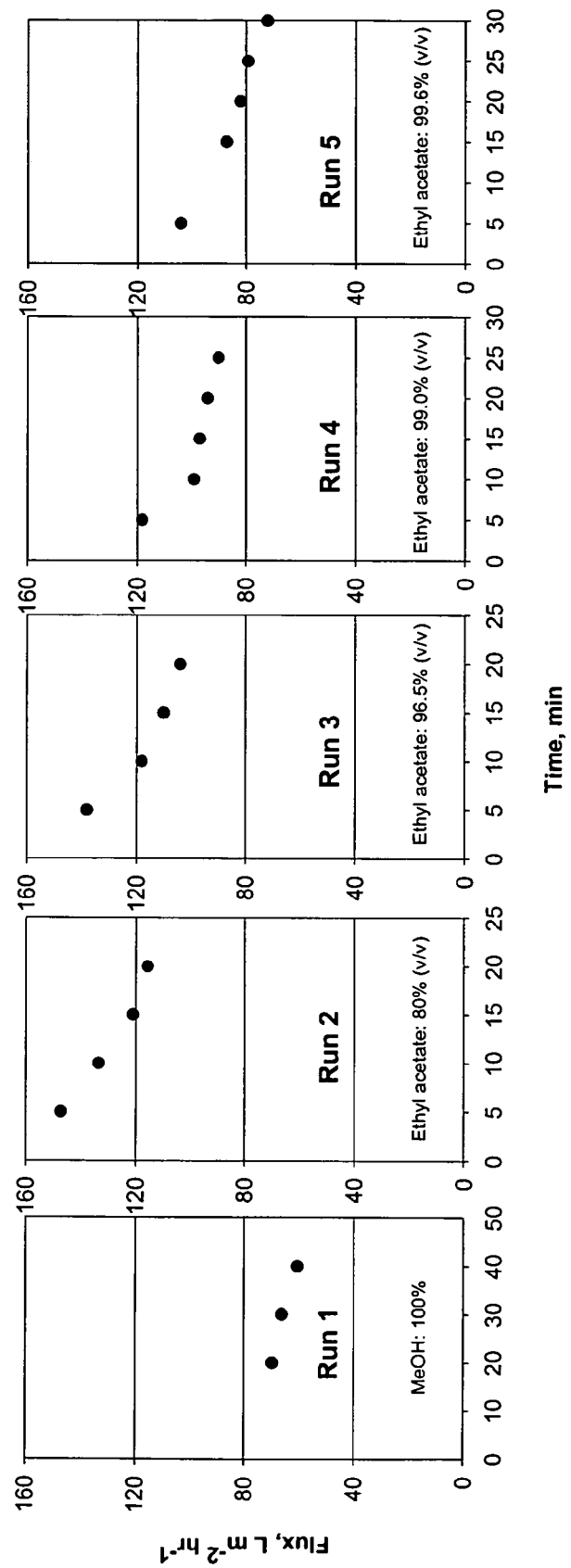
Figure 5:
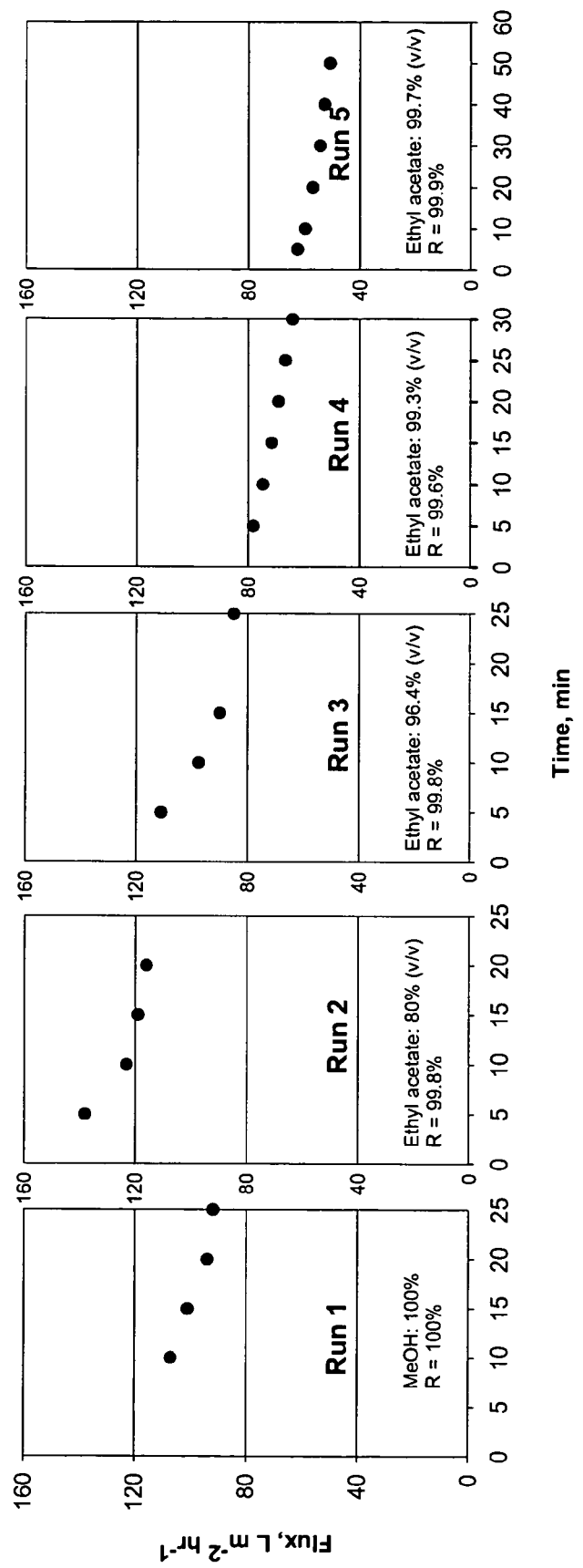
Figure 6:
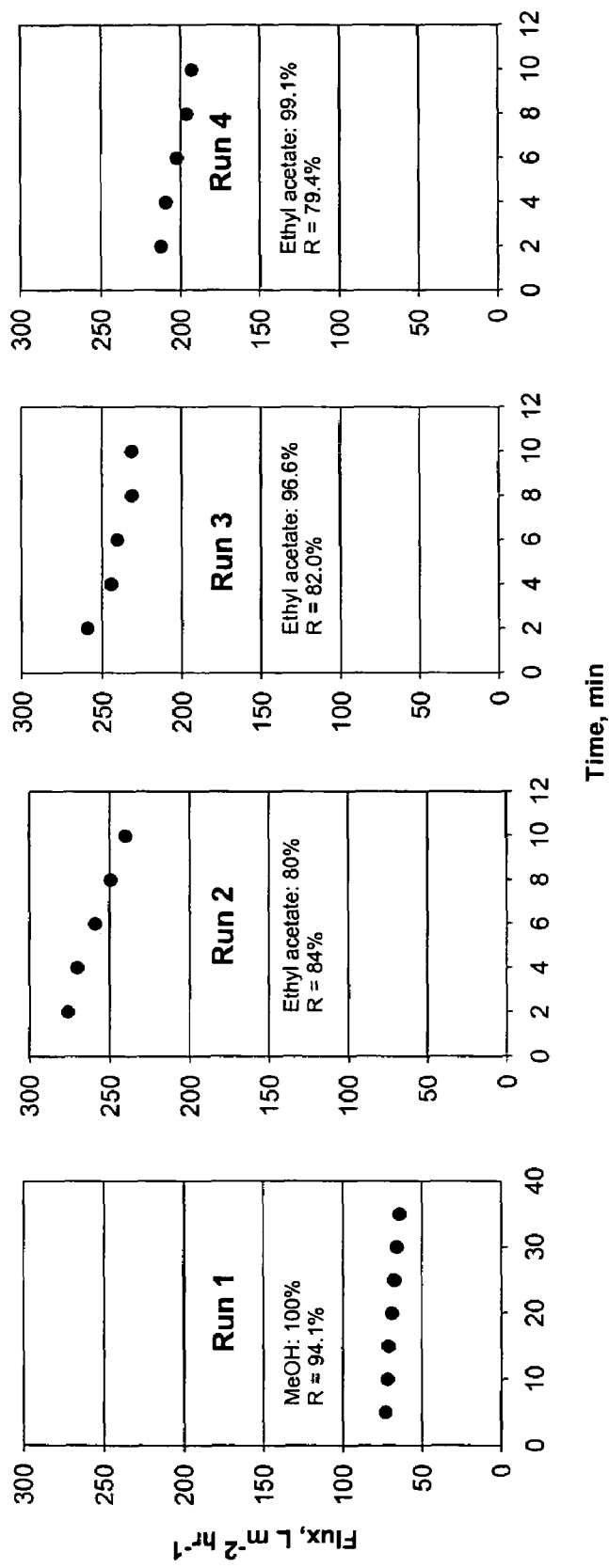

The portion of organic liquid removed during steps (b) and (e) may be greater than 30% of the starting organic liquid, preferably greater than 50% of the starting organic liquid, yet more preferably greater than 70% of the starting organic liquid, even more preferably greater than 80% of the starting organic liquid The invention will now be described, by way of example only, with reference to the accompanying drawings in which:

FIG. 1 is a schematic of an apparatus operating the process of the present invention, FIG. 2 is a schematic of an apparatus operating the process of the present invention, FIG. 3 shows graphs, FIG. 4 shows graphs, FIG. 5 shows graphs, and FIG. 6 shows graphs.

FIG. 1 shows a schematic of one embodiment of the process. The organic liquid mixture containing the first solvent and dissolved solute is fed (1) to a pressure cell (4) containing a membrane (5), so that the organic liquid mixture is contacted with the first surface of the membrane. Pressure is applied to the organic liquid through an inert gas (3). The organic liquid above the membrane is kept stirred using a stirrer (2) to reduce fouling of the membrane surface. A portion of the organic liquid passes through the membrane and exits the cell (6). The second solvent is fed to the cell through line (7) via a pump (8). A second pump (10) removes organic liquid from the cell through line (9). The process can be operated with any of the flows through lines (1), (6), (7), (9) continuous, or discontinuous, and by removing and reapplying the pressure as required through line (3). The process in this example is operated as a dead-end filtration process. In this dead-end configuration it is possible to operate the process in batch so that during each filtration stage a substantial fraction of solvent is forced out of the organic liquid mixture as permeate (6). This style of operation may lead to lower fluxes than the same configuration operated continuously, as in the batch process the solute may tend to build up as a layer on the surface of the membrane as it becomes concentrated in the retentate. However, it will provide a solvent exchange to the same degree as the continuous process while using less second solvent.

FIG. 2 shows another embodiment of the process. The organic liquid mixture containing the first solvent and the dissolved solute is fed (20) to a mixing tank (21) where second solvent is added (23). The organic liquid mixture is recirculated (24) by a pump (25) through a membrane module (26) containing a selectively permeable membrane (27). A portion of the organic liquid permeates through the membrane under the pressure applied by the pump and exits the module (28). The organic liquid concentrated in solute (29) is returned to the mixing tank. Organic liquid containing the second solvent, small amounts of first solvent, and solute, is withdrawn from the mixing tank (22). The process in this example is operated as a cross-flow filtration process. In this configuration it is possible to use the cross-flow velocity of the membrane to avoid the build-up of layers of solute on the surface of the membrane. Any or all of flows (20), (22), (23), (24) may be continuous or discontinuous.

FIG. 3 relates to Membrane Solvent Exchange of toluene for methanol using STARMEM™ 122 as a membrane at 30 bar applied pressure, 20° C., and an initial concentration of 0.01 M TOABr. Rejection of TOABr was measured as >99.9% for all filtration runs, FIG. 4 relates to Membrane Solvent Exchange of methanol for ethyl; acetate using STARMEM™ 122 as a membrane at 30 bar, 20° C., and an initial concentration of 0.01 M TOABr. Rejection of TOABr was measured as >99.9% for all filtration runs, FIG. 5 relates to Membrane Solvent Exchange of methanol for ethyl acetate using STARMEM™ 122 as a membrane at 30 bar, 20° C., and an initial concentration of 0.01 M TOABr. Rejection of TBABr was measured as >99.5% for all filtration runs. Rejections for individual runs R shown on plots below.

FIG. 6 relates to Membrane Solvent Exchange of methanol for ethyl acetate using MPF50 as a membrane at 30 bar, 20° C., and an initial concentration of 0.01 M TBABr. Rejection of TBABr is shown at base of plot for each filtration run.

The invention will now be described in further detail in the following non-limiting Examples.

EXAMPLES

Example 1

The solvent flux and rejection of various membranes is demonstrated in this example. The solute is TetraOctylAmmoniumBromide (TOABr), MW=546 Daltons. Membranes selected for this study are listed in Table 1, showing membrane properties:

TABLE 1

Membrane Properties (Manufacturer's Data)

| Manufacturer | Membrane type | MW cutoff | Membrane property | Rejection (%) |
|---|---|---|---|---|
| Koch (USA) | MPF-50 | 700 | hydrophobic | 70 (Sudan IV, MW = 384, in ethyl acetate) |
| Osmonics (USA) | Desal-DK | 350 | hydrophilic | 96 (Sucrose, MW = 342, in water) |
| WR Grace (USA) | 142A | 220 | hydrophobic | 62 (2% n-decane, MW = 142, in toluene) |
|  | 142B | 200 | hydrophobic | 74 (2% n-decane, MW = 142, in toluene) |

MPF-50 and Desal-DK are available from membrane suppliers. WR Grace 142A and 142B membranes prepared using methods generally described in U.S. Pat. No. 5,624,166 and WO 00/06293, both to WR Grace and Co.

Retention and fluxes were determined using an Osmonics/Desal (USA) SEPA-ST test cell Membrane discs were cut from A4 sheets in circular discs 49 mm in diameter, giving an active membrane area of 16.9 cm². All experiments were carried out in a fume cupboard. The cell was pressurised with compressed nitrogen gas at pressures of 5-50 bar. The volume of feed solution was 100 mL and the volume of permeate was measured with a measuring cylinder. The solvent flux (J) was obtained by $$J = \frac{V}{At} \quad (2)$$

where V is the volume of permeate (solvent), A is membrane area and t is time. This results in an "average" flux being arrived at—in general fluxes were higher at the start of an experimental run than at the end.

All experiments were performed using a starting concentration of solute (TOABr) of 2 wt %. All toluene filtrations were at 20° C., all other solvents at 30° C. 10 ml was retained as permeate in each filtration and 90 ml withdrawn as permeate.

Results from these tests are shown in Table 2 below:

TABLE 2

Results for flux and rejection. Fluxes are measured in L m⁻² h⁻¹ at 30 BarG. Solute Rejection of TOABr(R) is defined in equation (1).

| Solvent | Toluene | | Methanol | | Ethyl Acetate | | Acetone | | Iso-propanol | |
|---|---|---|---|---|---|---|---|---|---|---|
| Membrane | R (%) | Flux | R | Flux | R | Flux | R | Flux | R | Flux |
| 142A | 99.8 | 34.9 | 99.8 | 25.4 | 100 | 43.7 | 100 | 66.7 | 100 | 4.9 |
| 142B | 99.7 | 48.6 | 99.9 | 19.7 | 100 | 57.3 | 99.9 | 114.4 | — | — |

TABLE 2-continued

Results for flux and rejection. Fluxes are measured in L m$^{-2}$ h$^{-1}$ at 30 BarG. Solute Rejection of TOABr(R) is defined in equation (1).

| Solvent | Toluene | | Methanol | | Ethyl Acetate | | Acetone | | Iso-propanol | |
|---|---|---|---|---|---|---|---|---|---|---|
| Membrane | R (%) | Flux | R | Flux | R | Flux | R | Flux | R | Flux |
| Desal DK | unstable | | 88.1 | 15.8 | unstable | | unstable | | — | — |
| MPF50 | 96.5 | 87.7 | — | — | — | — | — | — | 97.4 | 15.1 |

Based on these results, each of these membranes is suitable for use with at least one solvent-solute combination.

Example 2

The overall solute recovery possible during a solvent exchange operation carried out following the process of the invention is demonstrated in this example. A solution of 2 wt % TOABr in toluene was used as an initial organic liquid. A 100 ml sample of this organic liquid was filtered once using Membrane 1 so that 90 ml was withdrawn as permeate and 10 mL remained as retentate. To this 10 mL retentate, 90 mL of fresh second solvent was added. The filtration of the resulting 100 mL of organic liquid was carried out using Membrane 2 so that 90 mL was withdrawn as permeate and 10 mL remained as retentate. 90 mL of fresh second solvent was added to this retentate to provide a 100 ml final organic liquid containing TOABr solute. The recovery (W) of solute in this fraction is defined as:

$$W = \frac{(FinalMassSoluteinSecondSolvent)}{(InitialMassSoluteinFirstSolvent)} \times 100\%$$

The concentration of toluene in the final organic liquid was less than 1 wt %. Data for solute recoveries (W) are shown in Table 3.

TABLE 3

Solute Recovery W (%) during solvent exchange from a first solvent (toluene in all cases) to a second solvent (as shown in Table). Solute is TOABr in all experiments.

| Membranes | | Second Solvent | | | |
|---|---|---|---|---|---|
| Membrane 1 | Membrane 2 | Methanol | Ethyl Acetate | Acetone | Iso-Propanol |
| 142A | 142A[1] | 96.9 | 98.8 | 98.8 | 98.8 |
| 142B | 142B[1] | 95.9 | 96.7 | 95.8 | — |
| 142A | 142B | 97.9 | 98.8 | 97.9 | — |
| 142B | 142A | 94.8 | 96.7 | 96.7 | — |
| 142A | DK | 46.3 | — | — | — |
| 142A | MPF50 | — | — | — | 61.5 |
| 142B | MPF50 | — | — | — | 61.5 |

[1]Same membrane disc as used in first filtration.

Example 3

The process of solvent exchange is demonstrated in this example. The solutes are TetraOctylAmmoniumBromide (TOABr), MW=546 Daltons, and TetraButylAmmonium-Bromide (TBABr) MW=322 Daltons. Membranes used are STARMEM™ 122 supplied by W. R. Grace, and MPF-50 from Koch Membrane Systems (USA). STARMEM is a trademark of W. R. Grace.

Retention and fluxes were determined using an Osmonics/Desal (USA) SEPA-ST test cell Membrane discs were cut from A4 sheets in circular discs 49 mm in diameter, giving an active membrane area of 16.9 cm$^2$. All experiments were carried out in a fume cupboard. The cell was pressurised with compressed nitrogen gas at pressures of 5-50 bar. The volume of feed solution was 100 mL and the volume of permeate was measured with a measuring cylinder. The solvent flux (J) was obtained by $$J = \frac{V}{At} \quad (2)$$

where V is the volume of permeate (solvent), A is membrane area and t is time. This results in an "average" flux being arrived at—in general fluxes were higher at the start of an experimental run than at the end.

The solvent exchanges from solvent 1 to solvent 2 were carried out as follows:
(1) An initial 100 ml of starting solution containing solute at 0.01 M was concentrated to a retentate volume of 20 ml in the pressurised membrane cell;
(2) The membrane cell was depressurized, the 20 ml retentate was made up to 100 ml by adding the solvent 2 and mixing well;
(3) Repeat steps (1) and (2) until the purity of the second solvent (measured using gas chromatography) is judged sufficient.

All filtration steps in this study were carried out at 30 bar applied pressure and room temperature (around 20° C.).

Solvents, solutes and membranes employed are shown in Table 4 below:

TABLE 4

| | | Solvent Exchanges | | |
|---|---|---|---|---|
| Exchange | Solvent 1 | Solvent 2 | Membrane | Solute |
| #1 | toluene | methanol | STARMEM ™ 122 | TOABr |
| #2 | methanol | ethyl acetate | STARMEM ™ 122 | TOABr |
| #3 | methanol | ethyl acetate | STARMEM ™ 122 | TBABr |
| #4 | methanol | ethyl acetate | MPF50 | TBABr |

The results are shown in FIGS. 3 to 6.

All publications mentioned in the above specification are herein incorporated by reference. Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in chemistry or related fields are intended to be within the scope of the following claims.

The invention claimed is:

1. A process for modifying a first organic composition resulting from an organic synthesis reaction, said composition comprising
   (i) at least one first organic solvent having a molecular weight less than 300 daltons,
   (ii) at least one solute having a molecular weight between 200 and 2,000 daltons, and
   (iii) at least one second organic solvent having a molecular weight less than 300 daltons that is distinct from said first organic solvent to produce a modified organic composition in which the concentration of the at least one first organic solvent is reduced and the concentration of the at least one second organic solvent is increased,
said method comprising the steps of:
   (a) providing a selectively permeable nanofiltration membrane having a first surface and a second surface;
   (b) transferring a portion of the first organic solvent and optionally a portion of the solute from the first surface to the second surface across the membrane by contacting the first organic composition with the first surface, wherein the pressure at the first surface is greater than the pressure at the second surface, and wherein the membrane is a selectively permeable nanofiltration membrane such that the membrane rejection (R) of the solute is greater than 90%;
   (c) adding a portion of the second organic solvent to the organic composition retained at the first surface of the membrane;
   (d) transferring a portion of the first and second organic solvents and optionally a portion of the solute from the first surface to the second surface across the membrane by contacting the organic composition from step (c) with the first surface, wherein the pressure at the first surface is greater than the pressure at the second surface; and
   (e) repeating the steps of adding the second organic solvent and contacting the organic composition with the selectively permeable nanofiltration membrane under pressure until the final concentration of the first solvent in the organic composition is reduced below a pre-determined value relative to the concentration of the second solvent in the organic composition.

2. A process according to claim 1 in which more than one selectively permeable nanofiltration membrane is used for consecutive membrane filtration stages, wherein said membranes are selectively permeable nanofiltration membranes such that the membrane rejection (R) of the solute is greater than 90%.

3. A process according to claim 1 in which the first organic solvent is a first mixture of solvents.

4. A process according to claim 1 in which the second organic solvent is a second mixture of solvents distinct from the first organic solvent.

5. A process according to claim 1 in which there is more than one solute present in the organic composition which is retained at the surface of the membrane.

6. A process according to claim 1 in which there is more than one solute present in the organic composition which is retained at the surface of the membrane, and in which at least one solute is not retained at the surface of the membrane.

7. A process according to claim 1 which at least one solute present in the organic composition attaches itself to the membrane or otherwise precipitates out of the composition during a filtration step, and is re-dissolved by addition of the second solvent.

8. A process according to claim 1 wherein at least one organic solute is separated from the organic composition produced from the process by crystallization.

9. A process according to claim 1 in which the solute has a molecular weight above 200 Daltons.

10. A process according to claim 1 in which the solute has a molecular weight above 300 Daltons.

11. A process according to claim 1 in which the solute has a molecular weight above 400 Daltons.

12. A process according to claim 1 in which the first or second organic solvents are independently selected from the group consisting of aromatics, alkanes, ketones, glycols, chlorinated solvents, esters, ethers, amines, nitriles, aldehydes, phenols, amides, carboxylic acids, alcohols and dipolar aprotic solvents, and mixtures thereof, and in which the second organic solvent is distinct from the first organic solvent.

13. A process according to claim 1 in which the first or second organic solvents are independently selected from the group consisting of toluene, xylene, benzene, styrene, anisole, chlorobenzene, dichlorobenzene, chloroform, dichloromethane, dichloroethane, ethyl acetate, methyl ether ketone (MEK), methyl iso butyl ketone (MIBK), acetone, ethylene glycol, ethanol, methanol, propanol, butanol, hexane, cyclohexane, dimethoxyethane, methyl tert butyl ether (MTBE), diethyl ether, adiponitrile, N,N dimethylformamide, dimethyl sulfoxide, dioxane, nitromethane, nitrobenzene, pyridine, carbon disulfide, tetrahydrofuran, N-methyl pyrrolidone, acetonitrile, water, and mixtures thereof, and in which the second organic solvent is distinct from the first organic solvent.

14. A process according to claim 1 in which the selectively permeable nanofiltration membrane has cylindrical or planar geometry and is configured as spiral wound, plate and frame, shell and tube, or derivative designs thereof.

15. A process according to claim 1 where one or more of the membrane separation steps is operated in a dead-end filtration mode.

16. A process according to claim 1 where one or more of the membrane separation steps is operated in a cross-flow filtration mode.

17. A process according to claim 1 in which the selectively permeable nanofiltration membrane separates solutes with molecular weights greater than 200 Daltons from solvents with molecular weights less than 200 Daltons.

18. A process according to claim 1 in which the selectively permeable nanofiltration membrane separates solutes with molecular weights greater than 300 Daltons from solvents with molecular weights less than 300 Daltons.

19. A process according to claim 1 in which the selectively permeable nanofiltration membrane is formed from a polymeric or ceramic material.

20. A process according to claim 1 wherein the membrane consists essentially of a polyimide polymer based on any of the following:
   (i) a polymer based on 5(6)-amino-1-(4'-aminophenyl)-1, 3-trimethylindane and benzophenone tetracarboxylic acid;

(ii) a polymer with 1 (or 3)-(4-aminophenyl)-2,3-dihydro-1,3,3 (or 1,1,3)-trimethyl-1H-inden5-amine and 5,5'-carbonylbis-1,3-isobenzofurandione;

(iii) a copolymer derived from the co-condensation of benzophenone 3,3',4,4'-tetracarboxylic acid dianhydride and a mixture of di(4-aminophenyl) methane and toluene diamine of the corresponding diisocyanates, 4,4'-methylenebis(phenyl isocyanate) and toluene diisocyanate; or (iv) a copolymer derived from the co-condensation of 1 H,3H-Benzo[1,2-c: 4,5-c']difuran 1,3,5,7-tetrone with 5,5'-carbonylbis[1,3-isobenzofurandione], 1,3-diisocyanato-2methylbenzene and 2,4-diisocyanato-1-methylbenzene.

21. A process according to claim 1 in which the selectively permeable nanofiltration membrane is a composite membrane.

22. A process according to claim 1 in which the membrane is nonporous and is formed from or comprises a material selected from the group consisting of modified polysiloxane based elastomers including polydimethylsiloxane (PDMS) based elastomers, ethylene-propylene diene (EPDM) based elastomers, polynorbornene based elastomers, polyoctenamer based elastomers, polyurethane based elastomers, butadiene and nitrile butadiene rubber based elastomers, natural rubber, butyl rubber based elastomers, polychloroprene (Neoprene) based elastomers, epichlorohydrin elastomers, polyacrylate elastomers, polyethylene, polypropylene, polytetrafluoroethylene (PTFE), polyvinylidene difluoride (PVDF) based elastomers, and mixtures thereof.

23. A process according to claim 1 wherein the membrane comprises a reinforcing material selected from an external mesh and support.

24. A process according to claim 1 wherein the membrane is a composite membrane comprising a porous support and at least one non-porous layer.

25. A process according to claim 1 wherein the process is performed in a continuous manner.

26. A process according to claim 1 wherein the process is performed in a discontinuous manner.

27. A process according to claim 1 wherein the membrane is pretreated by soaking in a constituent of the organic composition prior to use.

28. A process according to claim 1 wherein backflushing of the membrane using either solvent or gas is used to improve membrane flux.

* * * * *